Nov. 19, 1963 E. H. GATZERT 3,111,560
LINE CIRCUIT
Filed Aug. 4, 1960
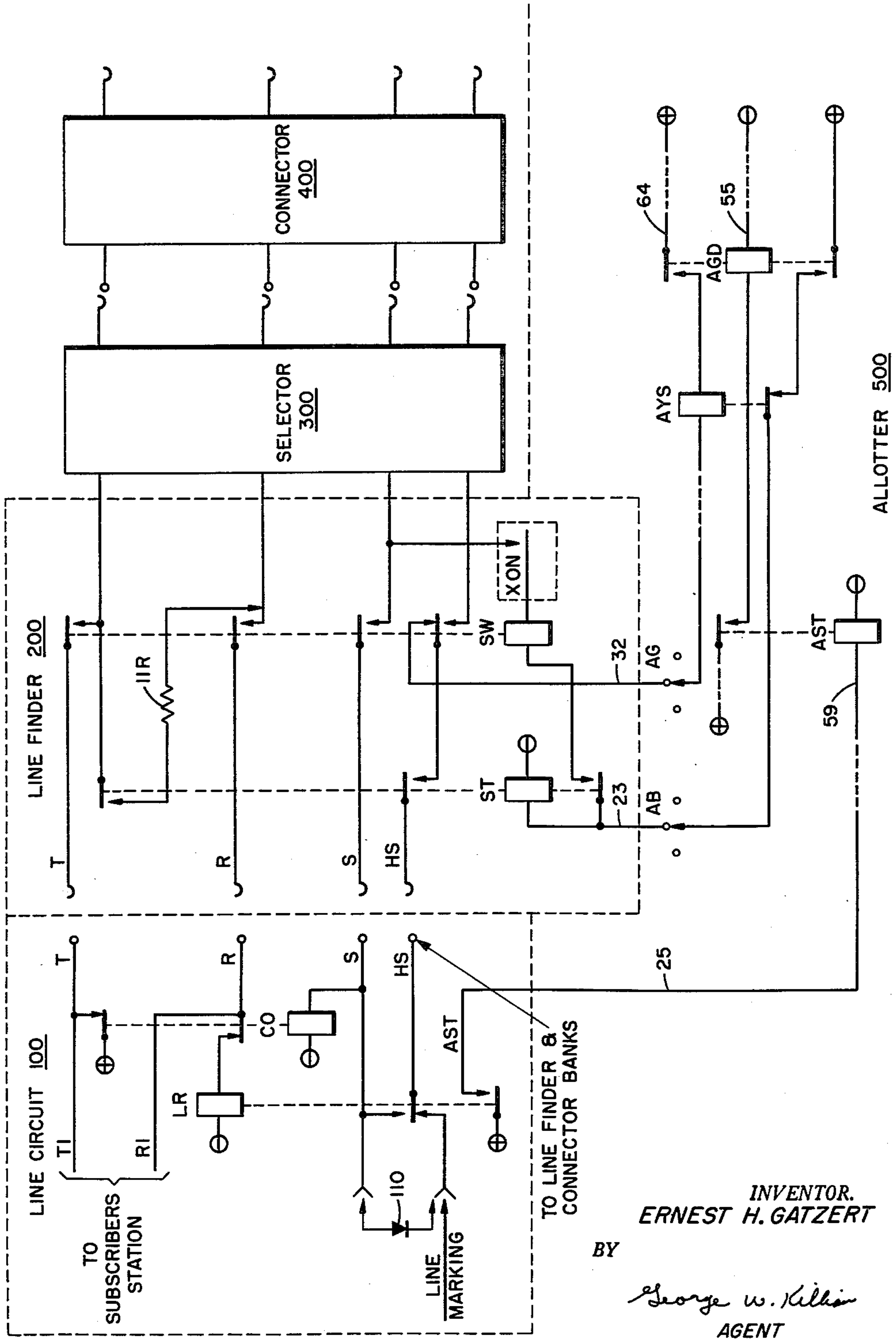
INVENTOR.
ERNEST H. GATZERT
BY
George W. Killian
AGENT

3,111,560
LINE CIRCUIT

Ernest H. Gatzert, Rolling Hills, Calif., assignor to General Dynamics Corporation, Rochester, N.Y., a corporation of Delaware Filed Aug. 4, 1960, Ser. No. 47,430
8 Claims. (Cl. 179—18)

This invention relates in general to automatic telephone systems and, more particularly, to line circuits for use therein.

Although the invention herein disclosed is suitable for more general application, it is particularly adapted for use in automatic telephone systems serving not over one hundred lines. As is well known in the telephone art, it is conventional to provide two terminal sets for each line; one to serve as a calling terminal set, and the other to serve as a called terminal set. It is apparent that the use of the same terminal set as both the calling and called terminal set would provide a more efficient, compact and economical system.

Accordingly, it is the general object of this invention to provide a new and improved automatic telephone system.

It is a more particular object of this invention to provide a new and improved automatic telephone system which employs a single terminal set as both the calling and called terminal set.

In automatic telephone systems employing shared equipment it is necessary for a lead of the calling terminal set to be electrically marked in a particular manner to enable a linefinder to distinguish the calling line from all other idle and busy lines in the same group. Thus, the status of each line is conventionally indicated on a single lead which is, therefore, required to indicate three separate conditions as follows: (1) a busy line, (2) an idle line, and (3) a line seeking to originate a call and awaiting the association of a linefinder. This marking is usually done on a lead which is known, in the art, as a sleeve lead. Traditionally, the busy condition of the calling terminal is indicated by the presence of a reference, or ground, potential on the sleeve lead. The idle condition is indicated by the lack of any potential on the sleeve lead. The third condition is usually represented by the presence of a resistance potential on the sleeve lead. Systems of the prior art have required the use of a separate lead from the called terminal set to indicate the status of the connected line. At the called terminal set, only two conditions are required to be indicated, namely, busy and idle. As in the case for the lead from the calling terminal set, the busy condition is traditionally indicated by the presence of a reference, or ground, potential on the sleeve lead of the called terminal set, while the idle condition is indicated by having a resistance potential on the sleeve lead of the calling terminal set. It will be observed that the idle condition of the sleeve lead of the calling and called terminal sets are indicated differently and, therefore, prior systems have used separate and distinct leads for the called and calling terminal sets. Consequently, prior systems have employed two sleeve leads from each line circuit, one of which is connected to the calling terminal set for the linefinder bank, and the other of which is connected to the called terminal set for the connector bank sleeve lead. Since prior systems required separate sleeve leads for the calling and called terminal sets, it meant that the transmission leads, which are directly multipled, must be duplicated at the calling and called terminal sets.

The present invention provides means for permitting the linefinder and connector banks to be directly multipled together, or alternately, to permit linefinders and connectors to work into the same bank.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which illustrates, on a single sheet, a line circuit 100 incorporating the present invention; the pertinent parts of a typical linefinder 200 in a system incorporating the present invention; a block diagram of a conventional selector 300 and connector 400; and the pertinent parts of a typical allotter 500 as modified to work with the illustrated line circuit.

It is to be understood that only the details necessary to understand the invention have been shown; for example, only pertinent portions of a linefinder and allotter are shown. For a complete description of a linefinder-allotter, reference may be had to U.S. Patent 2,656,416. For convenience, the pertinent parts from the reference patent, which are shown herein as linefinder 200 and allotter 500, have been given the same reference numerals as are used in the cited patent. Where complete operating circuits for various relays in the linefinder and allotter are not shown, dotted lines are used to indicate additional contacts or other elements not shown herein.

For convenience, and in accordance with standard telephone practice and terminology, the connections made to the positive terminal of the D.C. power supply are indicated as (+) and will hereafter be referred to as "ground." In a similar manner, the connections made to the negative terminal of the D.C. power supply are indicated as (−) and will hereafter be referred to as "battery."

It is believed that the system can best be understood by tracing the extension of a call through the system. For this purpose, assume that a subscriber lifts the handset of his substation (not shown) for the purpose of originating a call. In a well known manner, a loop will be closed between the T1 and R1 leads of line circuit 100, thereby operating relay LR of the line circuit. Operation of relay LR places a ground on the AST lead to the allotter and multiples the HS lead with the S lead through the upper make contacts of the LR relay.

The ground on the AST lead to the allotter 500 will, as shown in detail in the reference patent and as indicated in the allotter section of the drawing, operate the allotter AST relay over leads 25 and 59. Operation of the AST relay will close a circuit to the AGD relay, which operates from battery present on lead 55. In response to the operation of these relays, the ST relay will operate and the allotter and linefinder will function together to drive the linefinder switch in a primary direction to find the level which is associated with the calling line and then the linefinder switch will be driven in its secondary direction to find the specific line within the level which is originating the call. Since the allotter and linefinder combination is fully disclosed in the reference patent, the details for stepping, or driving, the linefinder switch are not shown herein. However, for practicing this invention, the means for operating the AYS relay is altered from that shown in the reference patent and, therefore, its operation is shown and will be described.

As was previously mentioned, the operation of the LR relay was effective to multiple the S and HS leads of the line circuit thereby connecting battery through the coil of the CO relay to the HS lead. When the HS wiper of the linefinder switch is moving in the secondary direction and contacts an HS bank which has a resistance battery potential thereon, a current will flow from ground through lead 64, the upper operated contacts of relay AGD, the coil of relay AYS, the AG bank of the allotter rotary switch, lead 32, the lower break contacts on the SW relay, the middle make contacts on the ST relay and the HS wiper of the linefinder to the HS lead of the line circuit, and thence through the upper make contacts of the LR relay and through the coil of relay CO to battery. The AYS and CO relays will operate in response to the current flow in the above traced circuit. The break contacts of the CO relay are effective to open the circuit to the LR relay, thereby releasing it. As the HS wiper of the linefinder passes over the HS terminal of idle lines, the AYS relay will not be operated as there is no resistance battery potential present on the HS lead of idle line circuits. After the line circuit has been found by the linefinder, the HS lead of the line circuit may be used for line marking, or other auxiuiary functions. However, any line marking applied to the HS lead of the line circuit through the break contacts of the LR relay will necessarily have to be of a nature that will not falsely operate the AYS relay. This is not a restrictive limitation as ground, resistance battery, or other suitable signals, such as A.C. tone, may all be used.

Reference to the cited patent will show that at the start of the allotter-linefinder combination, the ST relay of the linefinder operated in response to the closing of the lower make contacts of the AGD relay which completes a circuit through the break contacts of the AYS relay, the AB bank of the allotter rotary switch and lead 23 to the ST relay. The upper contacts of the ST relay are effective to close a seizing loop to the associated selector 300 through resistor 11R. As is well known to those skilled in the art, the selector 300 will respond to seizure by placing a ground on its back sleeve lead, the third lead from the top left of the selector 300. This ground is conducted through XON contacts (which are arranged to close as soon as the switch associated with linefinder 200 takes its first step off-normal), to the right-hand terminal of the coil of the SW relay. When the AYS relay operates, the circuit which had operated the ST relay from ground at the lower contacts of the AGD relay is opened at the lower contacts of relays AYS. However, the ST relay remains operated with current flowing from battery at the right-hand terminal of the ST relay through the coil of the ST relay and its lower operated contacts, the coil of the SW relay, and XON contacts to the ground returned by the selector on its back sleeve. In response to the operation of the linefinder SW relay, the T, R, S and HS leads from the linecircuit are cut through, on a metallic basis, to the selector, and resistor 11R is disconnected from the loop. The selector is now under control of the subscriber's loop across T1 and R1. In addition to holding the ST and SW relays of the linefinder, the ground on the back sleeve of the selector is effective to hold the CO relay in the line circuit. In addition, the ground on the back sleeve of the selector is effective to mark the calling line as busy to prevent any other linefinder 200 or connector 400 from becoming associated with this line. The call may now continue through the selector and the connector in the conventional manner and the allotter will be released to operate with other linefinders.

Connector operations for busy testing or switchthrough occurs in the conventional manner as the S lead of the line circuit presents a resistance battery to the S wiper of the connector when the associated line circuit is idle and the S lead of the line circuit presents a ground to the S wiper of the connector when the associated line is busy.

Optional diode 110 may be provided in line circuit 100 in order to facilitate trunk hunting operation in the connector. Certain types of connectors are required to step, or advance, from the particular terminal accessed by direct dialing in response to the accessed terminal being busy. One type of trunk hunting connector which is widely used and well known in the art employs a strap between the S and HS terminals of those lines from which the connector should advance one step in response to a busy signal. Diode 110 provides the required strap to permit current flow from S to HS without interfering with linefinder operation which, as has been shown, requires current flow from HS to S only when the LR relay is operated.

In summary, there has been shown and described means for permitting linefinder and connector operation using a common set of terminals for the called and calling terminal set.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a step-by-step telephone system, linefinders and connectors having common banks, a plurality of line circuits each having individual first and second control conductors terminated in said banks, means including said linefinders and connectors for extending a transmission connection from a calling one to a called one of said line circuits, means for maintaining first and second marking potentials on said first control conductor when a transmission connection may and may not, respectively, be extended to said line circuit, means in said line circuit for connecting said first and second control conductors together when a connection is to be extended from said line circuit whereby the marking potential on said first control conductor is extended to said second control conductor, and means for connecting one of said linefinders with said line circuit in response to the marking potential on said second control conductor.

2. The combination as set forth in claim 1 and including means in said line circuit for disconnecting said first and second control conductors of said line circuit when one of said linefinders is connected to said line circuit.

3. In a telephone system, a line circuit, a linefinder, a connector, common banks serving said finder and said connector, means for terminating first and second control leads from said line circuit on a set of terminals in said common banks, means for connecting first and second electrical signals to said first control lead to provide an indication when a connection may not and may, respectively, be extended to said line circuit, means for connecting said linefinder to said line circuit in response to a predetermined electrical signal on said second control lead, means responsive to the connection of said line finder with said line circuit for connecting said first electrical signal to said first control lead, and means further responsive to said connection of said linefinder and said line circuit for removing the predetermined electrical signal from said second control lead whereby the second control lead is made available for other control functions.

4. In a telephone system, a line circuit, a linefinder, a connector, common banks serving said linefinder and said connector, means for terminating first and second control leads from said line circuit on a set of terminals of said common banks, means for completing a connection to said set of terminals through said connector, means for completing a connection from said set of terminals through said linefinder, means responsive to first and second marking potentials on said first control lead for inhibiting and enabling, respectively, the connection of said connector with said terminal set, means responsive to a marking potential on said second control lead for enabling the connection of said linefinder with said terminal set, and means responsive to the connection of said linefinder with said terminal set for removing the marking potential from said second control lead and for applying said first marking potential to said first control lead.

5. In a telephone system, a line circuit including first and second relays, a linefinder and associated finder banks, a connector and associated connector banks, a first control lead connected to said second relay and terminating on corresponding terminals of said finder and said connector banks, a second control lead from said line circuit and terminating on corresponding terminals of said finder and said connector banks, means responsive to the operation of said first relay for connecting said first and second control leads together, and means responsive to the operation of said second relay for releasing said first relay.

6. The combination set forth in claim 5 in which means are provided for operating said second relay over a circuit including said first control lead when a connection is completed to said line circuit, and in which means are provided for operating said second relay over a circuit including said second control lead when a connection is originated from said line circuit.

7. The combination set forth in claim 6 in which means are provided for holding said second relay operated over a circuit including said first control lead irrespective of the operating circuit for said second relay.

8. In a telephone system, a line circuit including first and second relays, a linefinder and associated finder banks, a connector and associated connector banks, first and second control leads from said line circuit, means for terminating said first and second control leads on appropriate corresponding terminals of said finder banks and said connector banks, means for connecting said first and second control leads together in response to the operation of said first relay, means responsive to the operation of said second relay for releasing said first relay, and means for connecting said first and second control leads together through a unidirectional device when said first relay is not operated.

References Cited in the file of this patent

UNITED STATES PATENTS

| | | |
|---|---|---|
| 2,656,416 | Kessler | Oct. 20, 1953 |
| 2,661,396 | Powell | Dec. 1, 1953 |
| 2,668,194 | Kessler et al. | Feb. 2, 1954 |